Patented May 8, 1951

2,552,502

UNITED STATES PATENT OFFICE 2,552,502

BETA-(PYRROLIDYL-1)-PROPANOL-2

Eugene H. Woodruff, Kalamazoo, Mich., assignor to The Upjohn Company, Kalamazoo, Mich., a corporation of Michigan No Drawing. Application September 11, 1947, Serial No. 773,522

4 Claims. (Cl. 260—313)

This invention relates to a beta-(pyrrolidyl-1)-propanol-2 and their salts with acids useful as intermediates in the preparation of physiologically active compounds, and to methods for their preparation.

The new alkyl-b-(pyrrolidyl-1)-ethanols, (b=beta) each contains an alkyl substituent on either the carbon atom alpha to the hydroxyl or on a carbon atom of the pyrrolidine nucleus, or both, and thus comprise b-(pyrrolidyl-1)-propanol-2, the b-(alkyl-pyrrolidyl-1)-ethanols and the b-(alkyl-pyrrolidyl-1)-isopropanols. They have the generic formula:

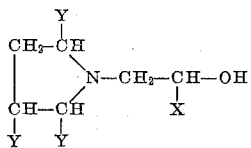

wherein X is a member of the group consisting of hydrogen and the methyl radical and each Y is a member of the group consisting of hydrogen and the lower alkyl radicals, the sum of the carbon atoms in X and Y being at least one. In each single compound, the several groups or radicals represented by Y may be different within the scope of the definition given. In a preferred modification, the sum of the carbon atoms in X and Y is always at least two and at least one Y is hydrogen. A further preferred modification of the invention contemplates compounds having the formula given wherein one Y represents hydrogen and the other two Y's each represents a lower alkyl radical.

These new compounds each contain either a branched chain alkylene radical between the nitrogen and the hydroxyl or at least one alkyl substituent on the pyrrolidine nucleus, or both. The effect of such branched chain or alkyl radical in imparting a high degree of physiological activity to certain compounds prepared from the herein described alkyl-b-(pyrrolidyl-1)-ethanols, e. g., to certain ethers thereof, is not to be expected from the teaching of the prior art. The term "lower alkyl" as used herein means an alkyl radical having less than five carbon atoms and having either a straight or branched carbon chain.

The basic alcohols herein described are mobile liquids readily soluble in most common organic liquids. They are very soluble in water. They readily form addition salts with mineral acids, such as hydrchloric and sulfuric acids, and with acetic and other strong organic acids. They also form quaternary ammonium salts readily with alkyl halides.

The new alkyl-b-(pyrrolidyl-1)-ethanols can be prepared by the reaction of pyrrolidine or an alkyl-pyrrolidine, such as 2-methyl-pyrrolidine, 3-ethyl-pyrrolidine, 2-butyl-pyrrolidine, 2-isopropyl-pyrrolidine, 2,3-dimethyl-pyrrolidine, 2,4-dimethyl-pyrrolidine, 2,5-dimethyl-pyrrolidine, 2,5-diethyl-pyrrolidine, 2-methyl-5-butyl-pyrrolidine, 2-ethyl-3-iso-butyl-pyrrolidine and 2,3,5-trimethyl-pyrrolidine, with a 1-halo-alkanol-2 or an alkene oxide containing two or three carbon atoms. Examples of halohydrins which can be used include ethylene chlorohydrin, ethylene bromohydrin, 1-chloropropanol-2, 1-iodopropanol-2 and 1-bromopropanol-2. Oxides which can be used are ethylene oxide and propylene oxide (propene oxide).

The reaction of the pyrrolidine compound with the halohydrin or alkene oxide can, if desired, be carried out without the use of a diluent, although the use of a diluent, such as chloroform, methanol, benzene or water is preferred. When a halohydrin is used, the inclusion in the reaction mixture of an acid-binding agent, such as an alkali metal hydroxide or other alkali or alkaline salt, is preferred. The reaction is carried out by mixing the reagents together either in substantially equi-molecular proportions or using an excess of the halohydrin or alkene oxide. In certain cases, particularly when using an alkene oxide, the reaction is somewhat exothermic and the reagents are preferably mixed slowly with cooling and agitation so as to maintain the temperature of the mixture at from about 30° to about 70° C., depending, among other factors, upon the boiling point of any diluent included in the reaction mixture. When a halohydrin is used, it can, with advantage, be added slowly to the pyrrolidine compound with agitation and the temperature maintained by heating or cooling the mixture, depending in part upon the rate of addition, at from about 30° to about 70° C. Reaction temperatures higher or lower than those mentioned can be employed, if desired. In some instances, the reaction mixture is let stand for from one to several hours after all the reagents have been added to permit the reaction to proceed substantially to completion.

The reaction mixture can be worked up in any one of a number of ways to recover the alkyl-b-(pyrrolidyl-1)-ethanol in substantially pure form. In the instances where an alkene oxide is used, recovery can be effected by fractional distillation of the reacted mixture, preferably under reduced pressure, and the alkyl b-(pyrrolidyl-1)-ethanol collected separably. In instances where a halohydrin is used, the reacted mixture can be alkalized, e. g., with aqueous sodium hydroxide or other suitable alkali and preferably after volatilization of any water-soluble organic diluent, and the alkyl-b-(pyrrolidyl-1)-ethanol extracted with a water-insoluble organic liquid, such as chloroform or ether, and the extract then fractionally distilled. Other ways of recovering the alkyl-b-(pyrrolidyl-1)-ethanol will be apparent to those familiar with the art.

Salts of the alkyl-b-(pyrrolidyl-1)-ethanols with acids can be prepared readily in a number of ways. The hydrochloride, for example, can be prepared readily by dissolving the alkyl-b-(pyrrolidyl-1)-ethanol in dry ether and absorbing dry hydrogen chloride in the mixture. The hydrochloride separates in crystalline form and can be recovered readily by filtering and washing with ether. Other hydrohalides can be prepared in the same way. Salts with organic acids can be prepared by dissolving the amine and acid in a common suitable solvent from which the salt can be crystallized. Many of the salts are extremely soluble in water and crystallization can be effected best from a suitable organic liquid.

The following examples illustrate methods by which members of this new group of substances can be prepared, but are not to be construed as limiting.

*Example 1.—b-(2,5-dimethyl-pyrrolidyl-1)-ethanol*

Twenty-nine grams of ethylene oxide was added to a solution of 49.5 grams of 2,5-dimethyl-pyrrolidine in 50 milliliters of absolute methanol. The mixture was cooled and the rate of addition was regulated to maintain the temperature between about 55° and 65° C. After the addition of the ethylene oxide was complete, the methanol was removed by distillation and the residual oil fractionally distilled under reduced pressure. There was thus obtained 53 grams of b-(2,5-dimethyl-pyrrolidyl-1)-ethanol boiling at 113° to 116° C. under a pressure of 62 millimeters of mercury.

*Example 2.—b-(2,4-dimethyl-pyrrolidyl-1)-ethanol*

Twenty-one grams of ethylene oxide was added to a solution of 39.6 grams of 2,4-dimethyl-pyrrolidine dissolved in 50 milliliters of absolute methanol at a rate to maintain the temperature of the mixture between about 55° and about 65° C. After the addition of the ethylene oxide was complete, the methanol was removed by distillation. Fractional distillation of the residue under reduced pressure gave 44.6 grams of b-(2,4-dimethyl-pyrrolidyl-1)-ethanol boiling at 117° C. under a pressure of 73 millimeters of mercury. The compound had an index of refraction $N_D^{25}=1.4573$.

*Example 3.—b-(2,4-dimethyl-pyrrolidyl-1)-propanol-2*

Fifty-one grams of 1-chloropropanol-2 was added dropwise to a stirred solution of 65.4 grams of 2,4-dimethyl-pyrrolidine and 28 grams of sodium hydroxide in 70 milliliters of water. The temperature of the mixture was maintained between about 40° and about 50° C. during the addition of the 1-chloropropanol-2. The mixture was then allowed to stand for about eighteen hours at room temperature. Fifty grams of solid sodium hydroxide was then dissolved in the mixture. The alkaline mixture was extracted with ether and the ether extract dried with solid potassium hydroxide. Vaporization of the ether and fractional distillation of the residue under reduced pressure gave 65.0 grams of b-(2,4-dimethyl-pyrrolidyl-1)-propanol-2 boiling at 118° to 119° C. under a pressure of 83 millimeters of mercury. The compound had an index of refraction $N_D^{25}=1.44514$.

*Example 4.—b-(2,5-dimethyl-pyrrolidyl-1)-propanol-2*

Seventy grams of 1-chloropropanol-2 was added dropwise to a stirred solution of 89.2 grams of 2,5-dimethyl-pyrrolidine and 40 grams of sodium hydroxide in 100 milliliters of water. The temperature of the reaction mixture was kept at about 40° C. during the addition of the 1-chloropropanol-2. After stirring for an additional five hours, the mixture was allowed to stand for eighteen hours at room temperature. An additional 57 grams of solid sodium hydroxide was then dissolved in the reaction mixture. When the solution had cooled, the mixture was extracted with ether and the ethereal extract dried with solid sodium hydroxide. Volatilization of the ether and fractional distillation of the residue under reduced pressure gave 83 grams of b-(2,5-dimethyl-pyrrolidyl-1)-propanol-2 boiling at 107° to 108° C. under a pressure of 50 millimeters of mercury.

*Example 5.—b-(Pyrrolidyl-1)-propanol-2*

Seventy-seven grams of 1-chloropropanol-2 was added dropwise to a stirred solution of 106.7 grams of pyrrolidine and 35 grams of sodium hydroxide in 220 milliliters of water. The temperature of the reaction mixture was kept at about 40° C. during the addition of the 1-chloropropanol-2. After stirring for an additional two hours, the mixture was allowed to stand eighteen hours and 50 grams of solid sodium hydroxide then dissolved in the mixture. Upon cooling the mixture, two layers formed, the upper of which consisted of b-(pyrrolidyl-1)-propanol-2. This layer was separated, dried with solid sodium hydroxide and fractionally distilled under reduced pressure. There was thus obtained 54.0 grams of b-(pyrrolidyl-1)-propanol-2 boiling at 116° to 117° C. under a pressure of 110 millimeters of mercury and having an index of refraction $N_D^{21}=1.4593$.

*Example 6.—b-(2,4-dimethyl-pyrrolidyl-1)-ethanol hydrochloride*

The hydrochloride of b-(2,4-dimethyl-pyrrolidyl-1)-ethanol is prepared conveniently by dissolving b-(2,4-dimethyl-pyrrolidyl-1)-ethanol in dry ether and passing dry hydrogen chloride into the solution. The hydrochloride separates as crystals and is recovered in substantially pure form by filtering, washing with ether and drying the crystals in vacuo. The hydrobromide of b-(2,4-dimethyl-pyrrolidyl-1)-ethanol as well as the hydrohalides of the other alkyl-b-(pyrrolidyl-1)-ethanols disclosed herein are prepared in analogous manner.

Compounds contemplated by the invention which can be prepared substantially by the methods described include b-(2-methyl-pyrrolidyl-1)-ethanol, b-(3-methyl-pyrrolidyl-1)-propanol-2, b-(2-ethyl-pyrolidyl-1)-ethanol, b-(2-n-propyl-pyrrolidyl-1)-propanol-2, b-(3-isopropyl-pyrrolidyl-1)-ethanol, b-(2-n-butylpyrrolidyl-1)-propanol-2, b-(3-isobutyl-pyrrolidyl-1)-ethanol, b-(2-tert-butyl-pyrrolidyl-1)-propanol-2, b-(2,3-dimethyl-pyrrolydyl-1)-ethanol, b-(2,5-dimethyl-pyrrolidyl-1)-propanol-2, b-(2,4-dimethyl-pyrrolidyl-1)-ethanol, b-(2,4-diethyl-pyrrolidyl-1)-propanol-2, b-(2,5-di-n-butyl-pyrrolidyl-1)-ethanol, b-(2,5-di-n-propyl-pyrrolidyl-1)-propanol-2, b-(2,5-di-iso-propyl-pyrrolidyl-1)-ethanol, b-(2-methyl-3-ethyl-pyrrolidyl-1)-ethanol, b-(2-ethyl-5-n-propyl-pyrrolidyl-1)-ethanol, b-(2-n-propyl-4-iso-propyl-pyrrolidyl-1)-propanol-2, b-(2-methyl-5-ethyl-pyrrolidyl-1)-ethanol, b-(2,3,5-trimethyl-pyrrolidyl-1)-propanol-2, b-(2,3,5-tri-n-butyl-pyrrolidyl-1)-propanol-2, b-(2,3-dimethyl-5-ethyl-pyrrolidyl-1)-propanol-2, b-(2-methyl-3,5-diethyl-pyrrolidyl-1)-propanol-2, b-(2-methyl-3-ethyl-5-n-propyl-pyrrolidyl-1)-ethanol and many others, as well as the salts thereof with acids, such as hydrochloric, hydrobromic, hydriodic, sulfuric, acetic, benzoic, phthalic, succinic, hexoic and b-chloropropionic acids.

I claim:

1. A compound from the group consisting of alkyl-beta-(pyrrolidyl-1)-ethanols having the formula:

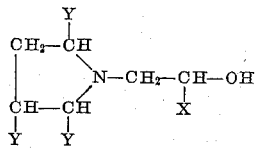

wherein X is the methyl radical and each Y is a member of the group consisting of hydrogen and the lower alkyl radicals, and their salts with acids.

2. A compound according to claim 1 wherein one Y represents hydrogen and the other two Y's each represent a lower alkyl radical.

3. Beta-(2,5-dimethyl-pyrrolidyl-1)-propanol-2.

4. Beta-(pyrrolidyl-1)-propanol-2.

EUGENE H. WOODRUFF.

REFERENCES CITED

The following references are of record in the file of this patent:

UNITED STATES PATENTS

| Number | Name | Date |
|---|---|---|
| 2,326,721 | Bruson | Aug. 10, 1943 |
| 2,410,197 | Borglin | Oct. 29, 1946 |
| 2,430,268 | Avakian | Nov. 4, 1947 |
| 2,454,092 | Rieveschl | Nov. 16, 1948 |

FOREIGN PATENTS

| Number | Country | Date |
|---|---|---|
| 116,335 | Germany | Dec. 1, 1900 |
| 282,456 | Germany | Mar. 2, 1915 |
| 851,178 | France | Sept. 25, 1939 |

OTHER REFERENCES

Blicke and Blake: J. Am. Chem. Soc. (March 1931) pages 1016 and 1022.

J. Org. Chem., vol. 10, No. 3, (1945), p. 244.